US012679254B2

(12) United States Patent
Park et al.

(10) Patent No.: US 12,679,254 B2
(45) Date of Patent: Jul. 14, 2026

(54) SWIVEL DEVICE FOR VEHICLE SEAT

(71) Applicant: Hyundai Transys Inc., Seosan-si (KR)

(72) Inventors: Heejun Park, Hwaseong-si (KR);
Chan Ju Kim, Hwaseong-si (KR); **Ki
Young Yun**, Hwaseong-si (KR)

(73) Assignee: Hyundai Transys Inc., Seosan-si (KR)

( * ) Notice: Subject to any disclaimer, the term of this
patent is extended or adjusted under 35
U.S.C. 154(b) by 232 days.

(21) Appl. No.: 18/409,378

(22) Filed: Jan. 10, 2024

(65) Prior Publication Data

US 2024/0227633 A1 Jul. 11, 2024

(30) Foreign Application Priority Data

Jan. 11, 2023 (KR) ........................ 10-2023-0004114

(51) Int. Cl.
B60N 2/14 (2006.01)
B60N 2/90 (2018.01)
(52) U.S. Cl.
CPC .............. B60N 2/14 (2013.01); B60N 2/933
(2018.02)
(58) Field of Classification Search
CPC ........... B60N 2/938; B60N 2/14; B60N 2/146
See application file for complete search history.

(56) References Cited

U.S. PATENT DOCUMENTS

| 9,227,529 B2 * | 1/2016 | Haller .................... B60N 2/062 |
| 11,208,010 B2 * | 12/2021 | Haller ...................... B60N 2/14 |
| 12,162,383 B2 * | 12/2024 | Kim .................. B60N 2/02246 |
| 12,344,133 B2 * | 7/2025 | Kim ........................ B60N 2/146 |
| 12,409,760 B2 * | 9/2025 | McLaughlin ........... B60N 2/14 |
| 2024/0270125 A1 * | 8/2024 | Kim ........................ B60N 2/146 |

FOREIGN PATENT DOCUMENTS

| CN | 110901479 B | * | 3/2022 | ............. B60N 2/146 |
| CN | 119428375 A | * | 2/2025 | ............. B60N 2/146 |
| DE | 102022213465 A1 | * | 6/2023 | ............. B60N 2/146 |
| KR | 10-2020-0078903 A1 | | 7/2020 | |
| KR | 10-2023-0006096 A | | 1/2023 | |
| KR | 20250028003 A | * | 2/2025 | ............... F16H 1/04 |
| KR | 102802628 B1 | * | 5/2025 | ......... B60N 2/02253 |

* cited by examiner

*Primary Examiner* — Timothy J Brindley
(74) *Attorney, Agent, or Firm* — Bridgeway IP Law
Group, PLLC; Jihun Kim

(57) ABSTRACT

A swivel device for a vehicle seat includes a rotary part
including a ring gear, a first pinion gear connected to a first
motor and configured to engage with the ring gear, and a
locking device configured to restrict a rotation of the rotary
part when an external force is applied to the rotary part when
the rotary part is in a stopped state.

13 Claims, 9 Drawing Sheets

SWIVEL DEVICE FOR VEHICLE SEAT

CROSS-REFERENCE TO RELATED APPLICATIONS

This application claims priority to and the benefit of Korean Patent Application No. 10-2023-0004114 filed in the Korean Intellectual Property Office on Jan. 11, 2023, the entire contents of which are incorporated herein by reference.

TECHNICAL FIELD

The present invention relates to a swivel device for a vehicle seat.

BACKGROUND ART

A power swivel may be mounted in a vehicle interior. The vehicle seat may be connected to a power swivel and rotated by an operation of the power swivel.

The power swivel includes a fixed part configured not to move, and a rotary part on which the vehicle seat is mounted and rotated. A pinion gear connected to a motor may be rotated by an operation of the motor mounted on the fixed part. As the pinion gear rotates, a ring gear engaging with the pinion gear may rotate. As the ring gear rotates, the rotary part may rotate.

In the event of a hard stop of the power swivel in which the pinion gear is positioned at two opposite ends of the ring gear, the pinion gear and the ring gear engage with each other without a clearance, such that the rotary part does not move.

However, because the power swivel in the related art is not equipped with a separate brake system, a motion of the rotary part occurs because of a clearance caused by backlashes of the pinion gear and the ring gear in the event of a non-hard stop in which the pinion gear is stopped at a position that is not the two opposite ends of the ring gear. The motion of the rotary part is transmitted to a passenger, who is seated in the vehicle seat, through the vehicle seat, which inevitably degrades the ride quality.

Document of Related Art

Patent Document
(Patent Document 1) Korean Patent Application Laid-Open No. 10-2020-0078903 (published on Jul. 2, 2020)

SUMMARY OF THE INVENTION

The present invention has been made in an effort to solve the above-mentioned problem, and an object of the present invention is to provide a swivel device for a vehicle seat, which is capable of preventing a motion of a vehicle seat by restricting a rotation of a rotary part by using an operation of a locking device in the event of a non-hard stop.

In order to achieve the above-mentioned object, the present invention provides a swivel device for a vehicle seat, the swivel device including: a rotary part including a ring gear, and a first pinion gear connected to a first motor and configured to engage with the ring gear; and a locking device configured to restrict a rotation of the rotary part when an external force is applied to the rotary part when the rotary part is in a stopped state.

The rotary part may further include a first mounting bracket on which the ring gear is mounted.

The locking device may include: a brake housing positioned on an upper portion of the first mounting bracket; a brake drum coupled in the brake housing and having guide grooves into which lock pins are inserted, the guide grooves being provided in at least one of an inner-diameter portion and an outer-diameter portion of the brake drum; and a pulley having a gear portion formed on an outer-diameter portion thereof, the pulley having protrusions configured to be inserted into the guide grooves and formed one surface directed toward the guide grooves, and the lock pins may be disposed in the guide groove and positioned at two opposite sides of the protrusion with the protrusion interposed therebetween.

The guide grooves may include: a first guide groove formed along the inner-diameter portion of the brake drum; and a second guide groove formed along the outer-diameter portion of the brake drum, and a ring portion of a housing bracket may be coupled to the inner-diameter portion of the brake drum.

A width between an inner race portion of the first guide groove and an outer-diameter portion of the ring portion may decrease in a direction from two opposite ends of the first guide groove to two opposite ends of the protrusion so that the lock pin is fitted, and the width may increase in a direction from the two opposite ends of the protrusion to the two opposite ends of the first guide groove so that the lock pin is released.

The ring portion may extend from a main body portion of the housing bracket, penetrate an inner-diameter portion of the pulley, and be coupled to the inner-diameter portion of the brake drum.

A width between an inner race portion of the second guide groove and an inner-diameter portion of the brake housing may decrease in a direction from two opposite ends of the second guide groove to two opposite ends of the protrusion so that the lock pin is fitted, and the width may increase in a direction from the two opposite ends of the protrusion and the two opposite ends of the second guide groove so that the lock pin is released.

Elastic members may be provided at two opposite ends of the first and second guide grooves and elastically support the lock pins.

Insertion grooves may be provided at the two opposite ends of the first and second guide grooves, and the elastic members may be at least partially inserted into the insertion grooves.

The gear portion of the pulley may be connected to a belt, the belt may be connected to a second pinion gear, and the second pinion gear may be connected to a second motor.

When an external force is applied to the rotary part when the rotary part is a stopped state, one side lock pin, which is elastically supported by the elastic member, may be fitted between the inner race portion of the first guide groove and the outer-diameter portion of the ring portion at one end of the protrusion, such that a locked state in which a rotation of the rotary part is restricted is implemented.

The second motor may operate prior to an operation of the first motor, power of the second motor may be transmitted to the pulley via the second pinion gear and the belt, the pulley may rotate, and one side lock pin, which is fitted in the first guide groove, and one side lock pin, which is fitted in the second guide groove, may move in a fitting release direction by being pushed by the protrusions by the rotation of the pulley, such that an unlocked state in which the rotary part is rotatable is implemented.

A first fixing member connected to the rotary part may be connected to a movement rail mounted on a floor in an interior of a vehicle.

The locking device may further include: a second mounting bracket connected to the first mounting bracket; a connection bracket connected to a main body portion of the housing bracket and the second mounting bracket; a cover coupled to an upper portion of the brake housing; and a second fixing member coupled to an upper portion of the cover and having at least one side connected to the second mounting bracket by a connection member.

The second mounting bracket may be connected to the vehicle seat.

The present invention may prevent the motion of the vehicle seat by restricting the rotation of the rotary part by using the operation of the locking device in the event of a non-hard stop.

The present invention may prevent the motion of the vehicle seat by restricting the rotation of the rotary part by using the locking device in the event of a non-hard stop, thereby significantly improving the ride quality.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
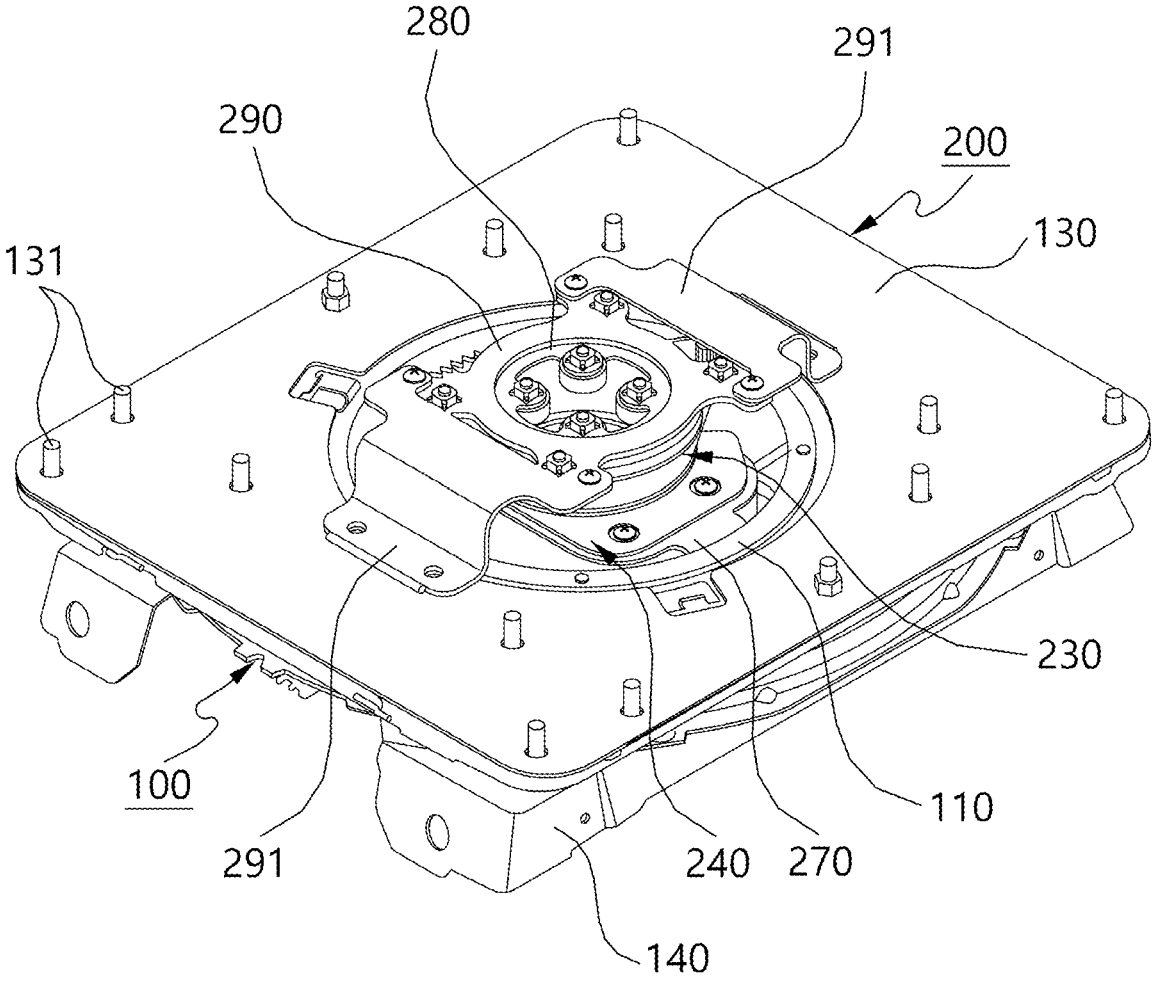
FIG. 1 is a perspective view of a swivel device for a vehicle seat according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

Figure 2:
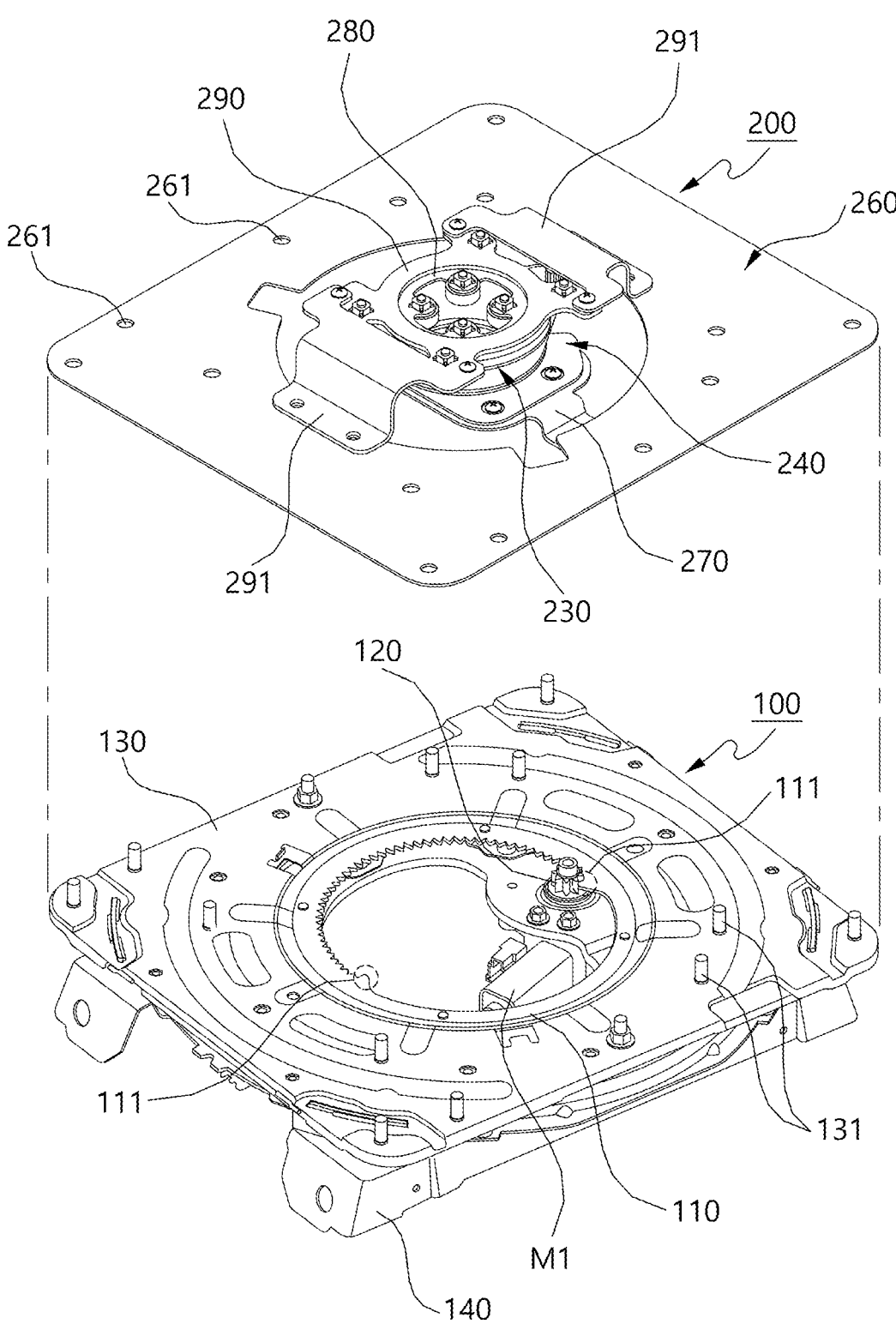
FIG. 2 is a view illustrating a rotary part and a locking device according to the exemplary embodiment of the present invention.

FIG. 1 is a perspective view of a swivel device for a vehicle seat according to an exemplary embodiment of the present invention, and FIG. 2 is a view illustrating a rotary part and a locking device according to the exemplary embodiment of the present invention.

As illustrated in FIGS. 1 and 2, the present invention includes a rotary part 100, and a locking device 200 configured to restrict a rotation of the rotary part 100 when an external force is applied to the stopped rotary part 100.

The rotary part 100 includes a first pinion gear 120 connected to a first motor M1 and configured to engage with a ring gear 110, a first mounting bracket 130 having a center at which the ring gear 110 is mounted, the first mounting bracket 130 having coupling pins 131 protruding toward the locking device 200 from an upper surface directed toward the locking device 200, and a first fixing member 140 coupled to a lower portion of the first mounting bracket 130.

Power of the first motor M1 may be transmitted to the ring gear 110 via the first pinion gear 120. The first mounting bracket 130 may be rotated by the rotation of the ring gear 110.

The first motor M1 may be mounted on the first fixing member 140. A lower portion of the rotary part 100, which is directed toward the first fixing member 140, may be connected to the first fixing member 140. The first fixing member 140 may be connected to a movement rail (not illustrated) mounted on a floor in an interior of a vehicle.

The first mounting bracket 130 may be connected to a second mounting bracket 260 of the locking device 200 by means of the coupling pins 131. The coupling pin 131 may be penetratively coupled to the second mounting bracket 260.

The first mounting bracket 130 may be formed in a quadrangular shape, but an external shape of the first mounting bracket 130 is not limited.

The locking device 200 includes the second mounting bracket 260, a connection bracket 270 connected to the second mounting bracket 260, the housing bracket 240 connected to the second mounting bracket 260 by means of the connection bracket 270 and positioned at a center of the second mounting bracket 260, a pulley 230 coupled to an upper portion of the housing bracket 240, a brake housing 210 coupled to an upper portion of the pulley 230, a cover 280 coupled to an upper portion of the brake housing 210, and a second fixing member 290 coupled to an upper portion of the cover 280.

The second mounting bracket 260 may have a shape that conforms to the first mounting bracket 130. The second mounting bracket 260 may be coupled to an upper portion of the first mounting bracket 130.

The second mounting bracket 260 may have through-holes 261. The coupling pins 131 of the first mounting bracket 130 may be penetratively coupled to the through-holes 261. The second mounting bracket 260 may be connected to a vehicle seat (not illustrated).

Two opposite sides of the second fixing member 290 may be connected to the second mounting bracket 260 by means of connection members 291. The second fixing member 290 and the connection members 291 may be connected by coupling members such as bolts and nuts.

Figure 3:
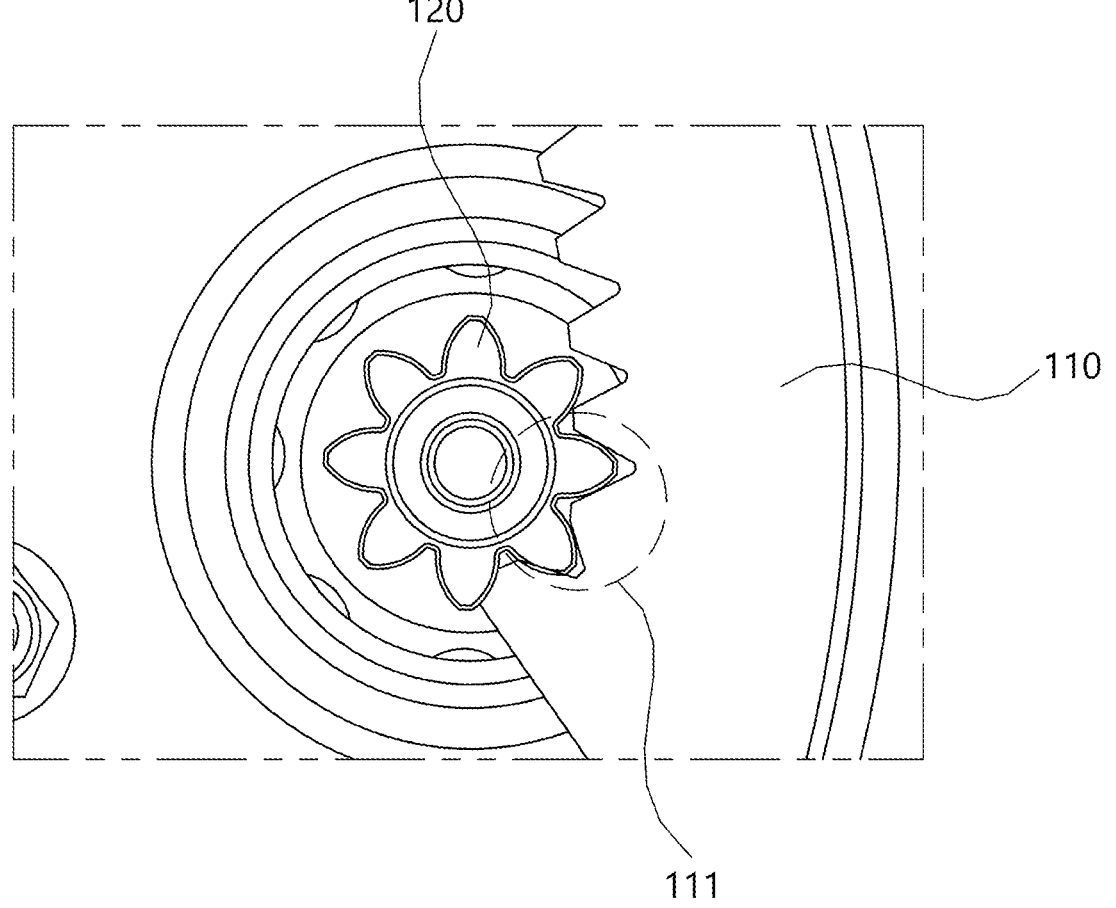
FIG. 3 is a view illustrating a position of a first pinion gear that engages with a ring gear in the event of a hard stop according to the exemplary embodiment of the present invention.

FIG. 3 is a view illustrating a position of the first pinion gear that engages with the ring gear in the event of a hard stop according to the exemplary embodiment of the present invention.

As illustrated in FIG. 3, in the event of a hard stop, the first pinion gear 120 may engage with two opposite ends 111 of an inner-diameter portion of the ring gear 110.

Figure 4:
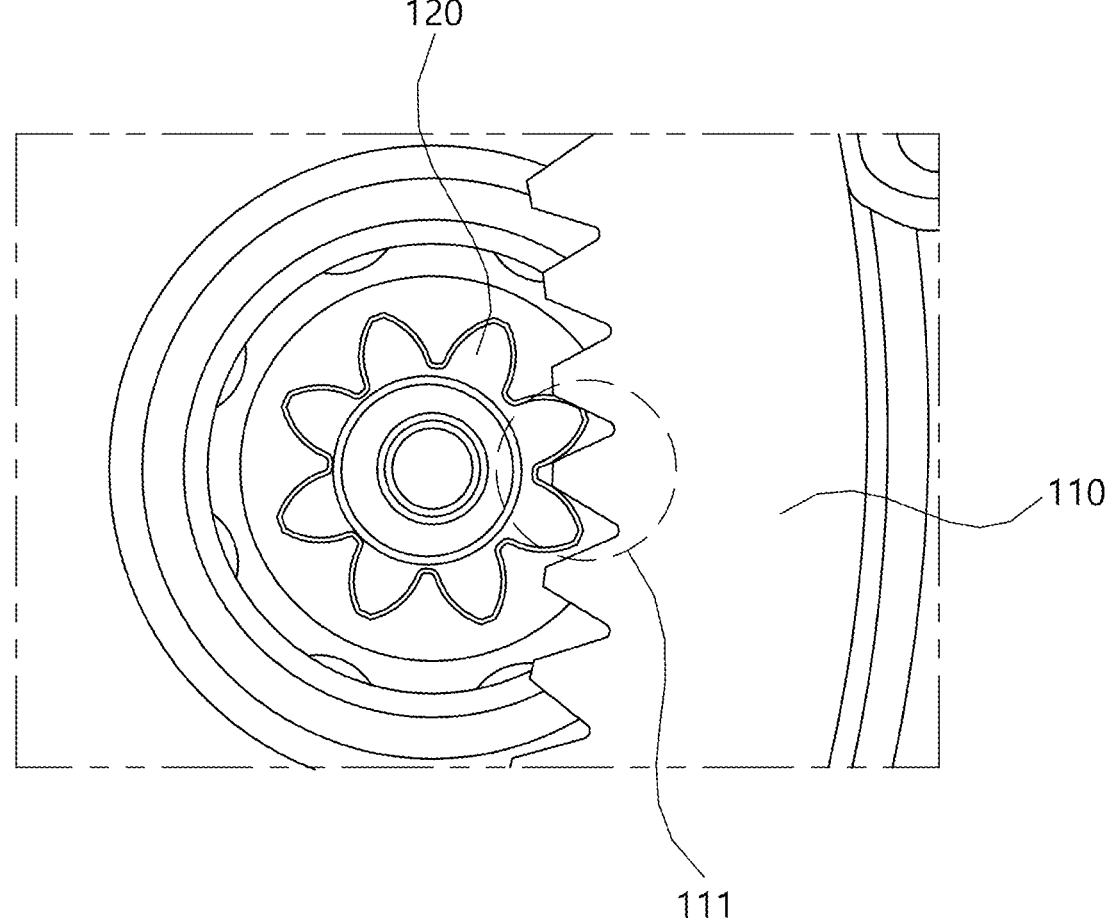
FIG. 4 is a view illustrating a position of the first pinion gear that engages with the ring gear in the event of a non-hard stop according to the exemplary embodiment of the present invention.

FIG. 4 is a view illustrating a position of the first pinion gear that engages with the ring gear in the event of a non-hard stop according to the exemplary embodiment of the present invention.

As illustrated in FIG. 4, in the event of a non-hard stop, the first pinion gear 120 may be positioned at a point between the two opposite ends 111 of the inner-diameter portion of the ring gear 110.

Figure 5:
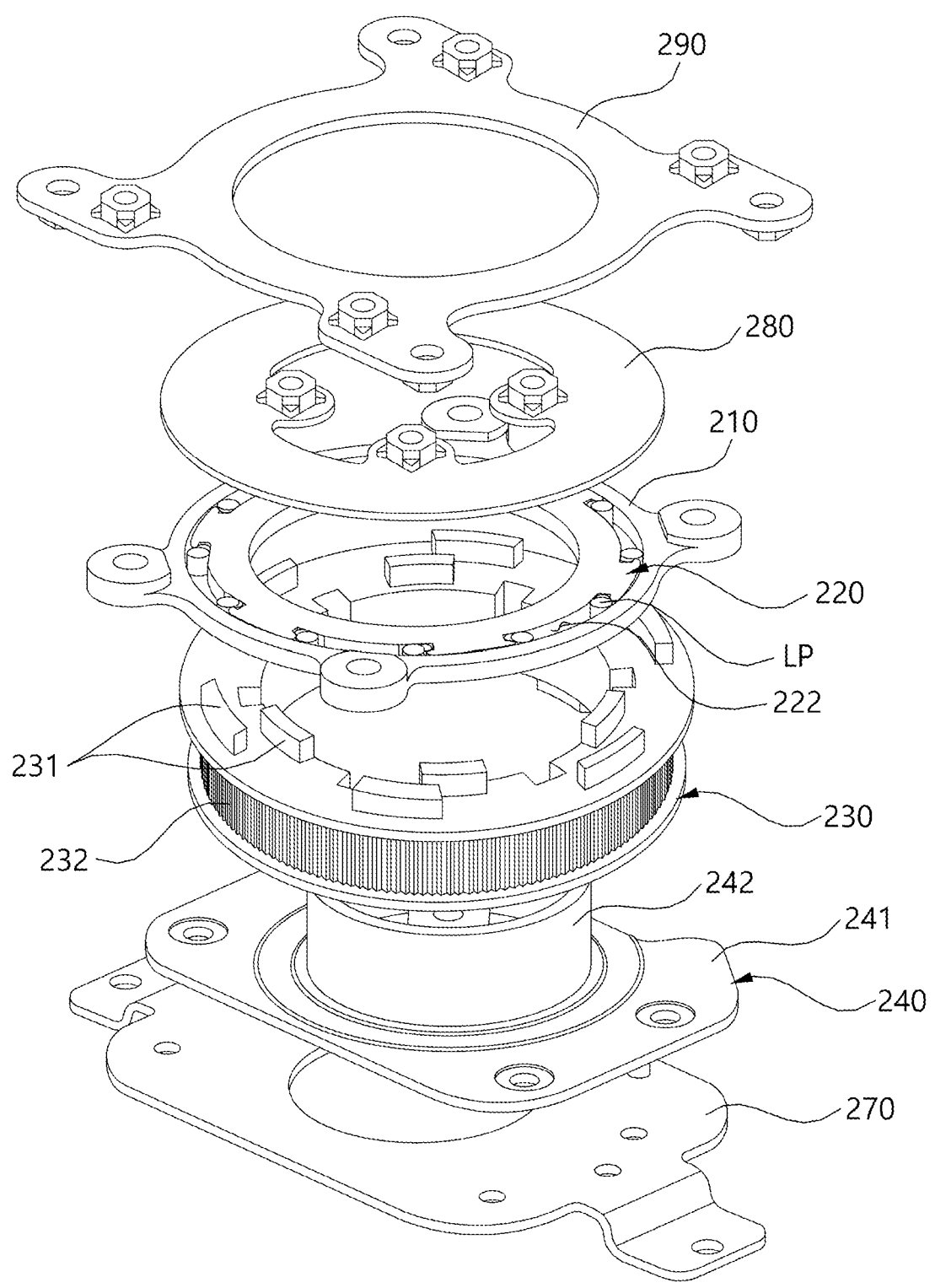
FIG. 5 is an exploded perspective view of a locking device according to the exemplary embodiment of the present invention.

FIG. 5 is an exploded perspective view of the locking device according to the exemplary embodiment of the present invention.

As illustrated in FIG. 5, a brake drum 220 may be coupled in the brake housing 210.

Guide grooves, into which lock pins LP are inserted, may be provided in at least one of an inner-diameter portion and an outer-diameter portion of the brake drum 220.

An outer-diameter portion of the pulley 230 may have a gear portion 232 to which a belt B may be coupled. Protrusions 231, which may be inserted into the guide grooves, may be formed on one surface of the pulley 230 that is directed toward the guide grooves. For example, the protrusion 231 may be formed in a circular arc shape.

The housing bracket 240 includes a main body portion 241 positioned adjacent to the connection bracket 270, and a ring portion 242 extending from the main body portion 241 toward the pulley 230.

The main body portion 241 may be coupled to the connection bracket 270 by coupling members such as bolts and nuts.

Figure 6:
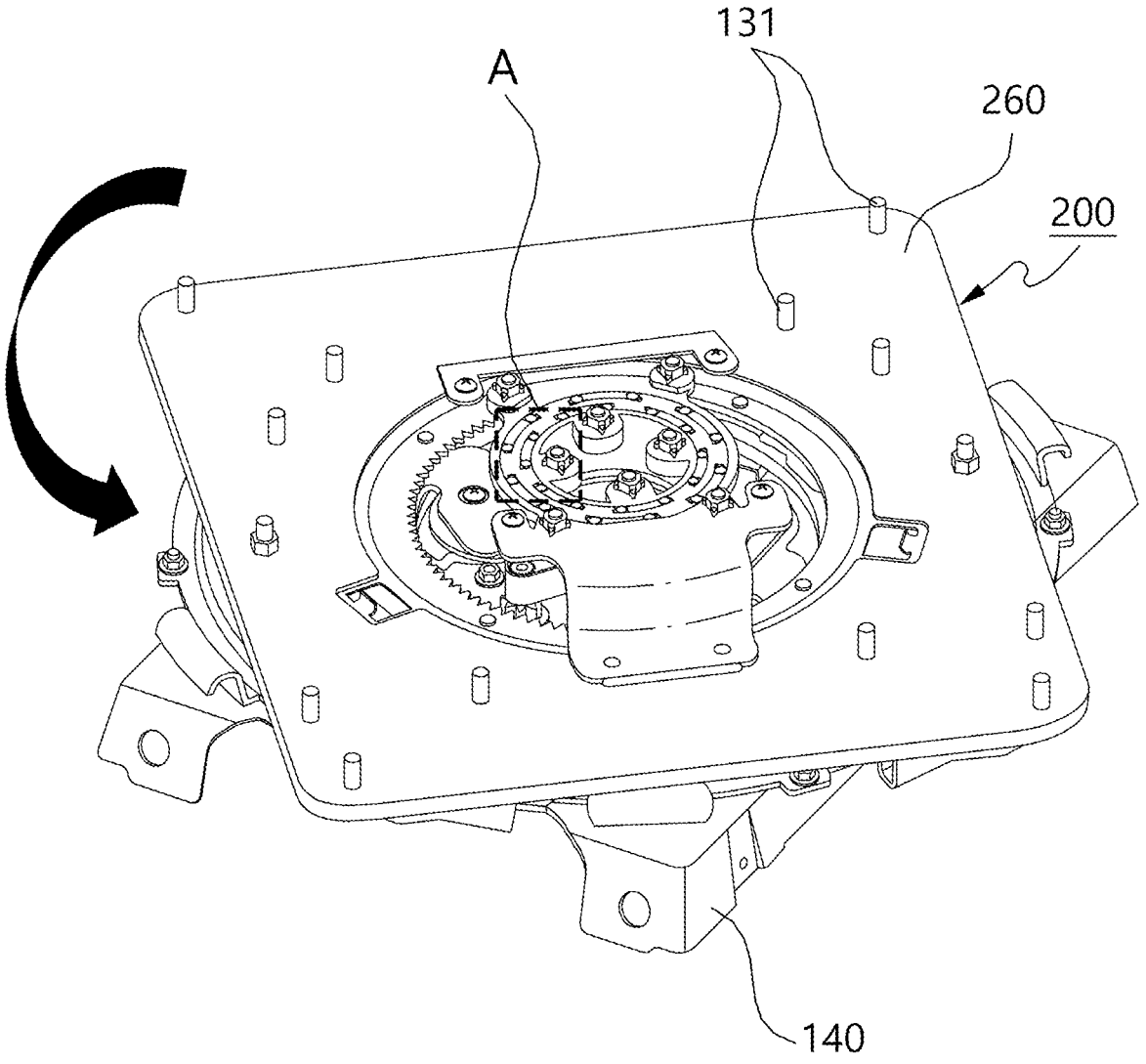
FIG. 6 is a view illustrating a non-hard stop state according to the exemplary embodiment of the present invention.
Figure 7:
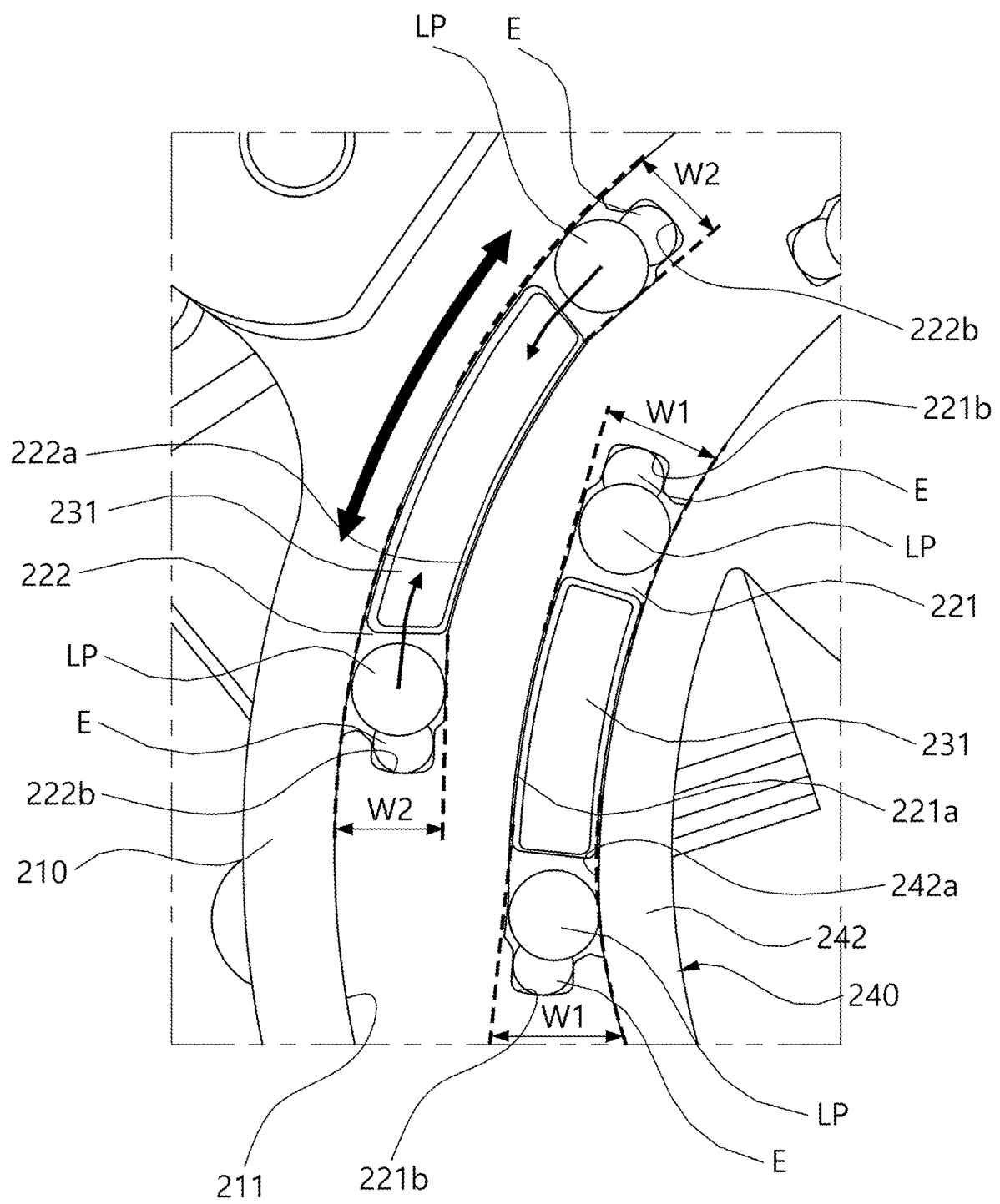
FIG. 7 is an enlarged view of part A in FIG. 6.

FIG. 6 is a view illustrating a non-hard stop state according to the exemplary embodiment of the present invention, and FIG. 7 is an enlarged view of part A in FIG. 6.

As illustrated in FIGS. 6 and 7, the guide grooves of the brake drum 220 include first guide grooves 221 and second guide grooves 222.

A plurality of first guide grooves 221 may be formed along the inner-diameter portion of the brake drum 220. The first guide groove 221 may be formed in a circular arc shape.

A plurality of second guide grooves 222 may be formed along the outer-diameter portion of the brake drum 220. The second guide groove 222 may be formed in a circular arc shape.

The ring portion 242 of the housing bracket 240 may be coupled to the inner-diameter portion of the brake drum 220. The ring portion 242 may penetrate the inner-diameter portion of the pulley 230 and be coupled to the inner-diameter portion of the brake drum 220.

The ring portion 242 may be coupled to the cover 280 by coupling members such as bolts and nuts in a state in which the ring portion 242 is coupled to the inner-diameter portion of the brake drum 220.

The lock pins LP may be positioned in the first and second guide grooves 221 and 222. The lock pins LP may be positioned at two opposite sides of the protrusion 231 with the protrusion 231 interposed therebetween.

As illustrated in FIG. 7, a width W1 between an inner race portion 221a of the first guide groove 221 and an outer-diameter portion 242a of the ring portion 242 may decrease in a direction from two opposite ends of the first guide groove 221 to two opposite ends of the protrusion 231 so that the lock pin LP may be fitted. The width W1 may increase in a direction from the two opposite ends of the protrusion 231 to the two opposite ends of the first guide groove 221 so that the lock pin LP is released.

A width W2 between an inner race portion 222a of the second guide groove 222 and an inner-diameter portion 211 of the brake housing 210 may decrease in a direction from two opposite ends of the second guide groove 222 to the two opposite ends of the protrusion 231 so that the lock pin LP may be fitted. The width W2 may increase in a direction from the two opposite ends of the protrusion 231 to the two opposite ends of the second guide groove 222 so that the lock pin LP may be released.

Elastic members E may be provided at two opposite ends of each of the first and second guide grooves 221 and 222 and elastically support the lock pins LP. Any elastic member E may be provided as long as the elastic member E may elastically support the lock pin LP. For example, the elastic member E may be made of elastomer.

When an external force is applied to the rotary part 100 when the rotary part 100 is in a stopped state, one side lock pin LP, which is elastically supported by the elastic member E, is fitted between the inner race portion 221a of the first guide groove 221 and the outer-diameter portion 242a of the ring portion 242 at one end of the protrusion 231, such that a locked state in which the rotation of the rotary part 100 is restricted may be implemented.

Figure 8:
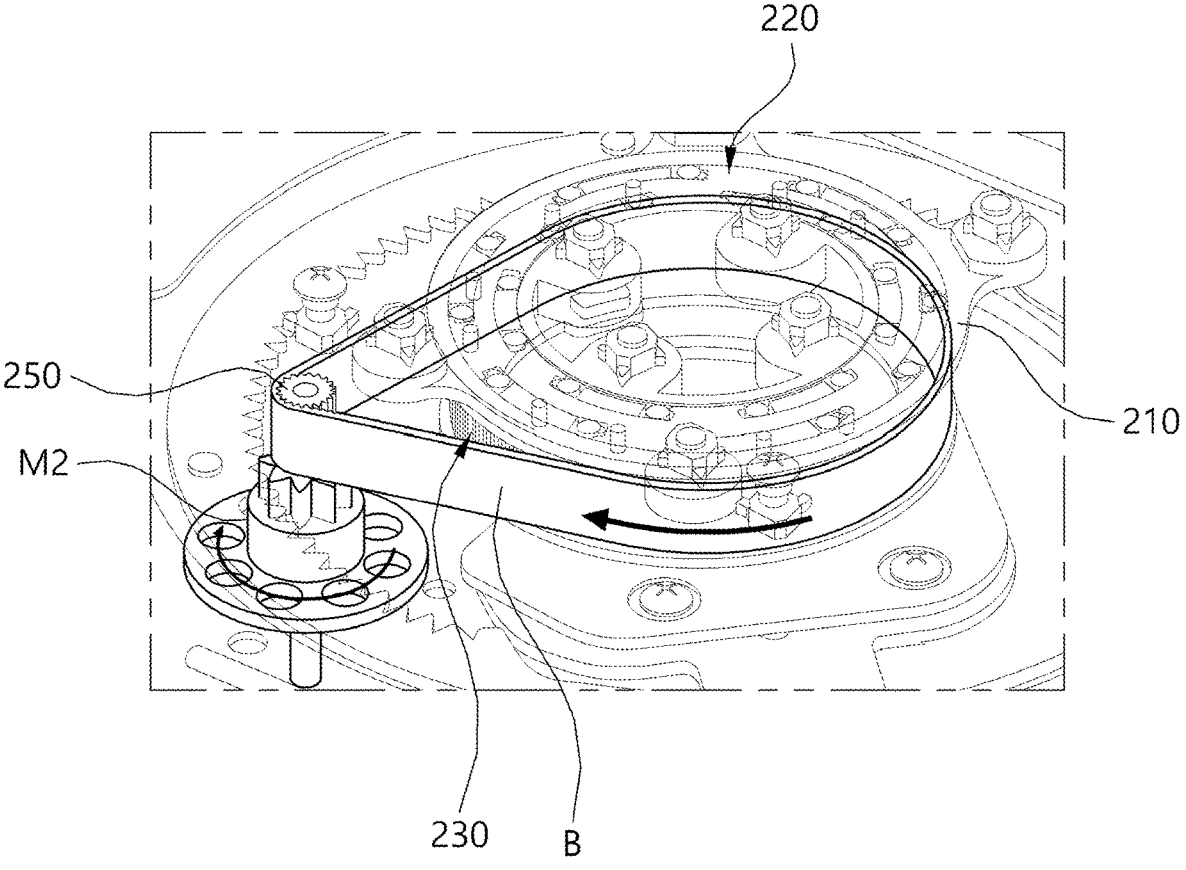
FIG. 8 is a view illustrating a power transmission process during an unlocking process according to the exemplary embodiment of the present invention.
Figure 9:
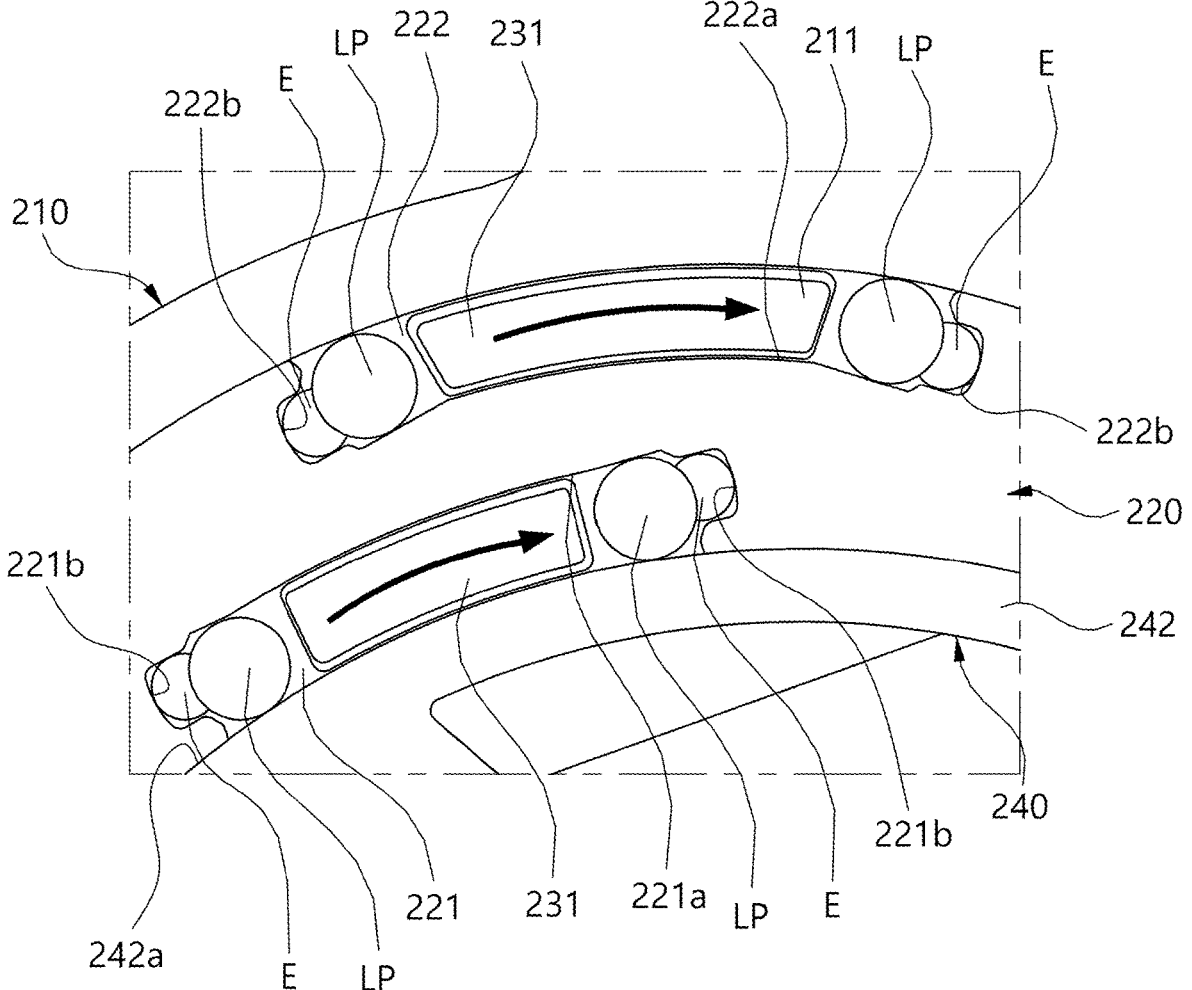
FIG. 9 is a view illustrating an operation during an unlocking process according to the exemplary embodiment of the present invention.

FIG. 8 is a view illustrating a power transmission process during an unlocking process according to the exemplary embodiment of the present invention, and FIG. 9 is a view illustrating an operation during an unlocking process according to the exemplary embodiment of the present invention.

As illustrated in FIGS. 8 and 9, the gear portion 232 of the pulley 230 may be connected to the belt B. The belt B may be connected to a second pinion gear 250. The second pinion gear 250 may be connected to a second motor M2.

The second motor M2 operates prior to the operation of the first motor M1, such that power of the second motor M2 may be transmitted to the pulley 230 via the second pinion gear 250 and the belt B, and the pulley 230 may rotate. The lock pins LP are moved in a fitting release direction by being pushed by the protrusions 231 by the rotation of the pulley 230, such that an unlocked state in which the rotary part 100 is rotatable may be implemented.

Next, an operation during a locking process of the present invention will be described more specifically.

Because a swivel device for a vehicle seat in the related art is not equipped with a separate locking device, there is a problem in that a rotary part in a stopped state moves because of a clearance caused by backlashes of a pinion gear and a ring gear when an external force is applied to the rotary part in a state in which the rotary part is stopped such as a non-hard stop state. The motion of the rotary part is transmitted to a passenger, who is seated in a vehicle seat, through the vehicle seat, which adversely affects the ride quality.

However, according to the present invention, when an external force is applied to the rotary part 100 in the stopped state of the rotary part 100 such as a non-hard stop state, the locking device 200 restricts the rotation of the rotary part 100, thereby improving the ride quality.

Specifically, as indicated by the arrow illustrated in FIG. 7, when an external force is applied to the rotary part 100, one side lock pin LP, which is positioned in the first guide groove 221 and elastically supported by the elastic member E, may be fitted between the inner race portion 221*a* of the first guide groove 221 and the outer-diameter portion 242*a* of the ring portion 242 at one end of the protrusion 231 to which the external force is applied.

At the same time, one side lock pin LP, which is positioned in the second guide groove 222 and elastically supported by the elastic member E, may be fitted between the inner race portion 222*a* of the second guide groove 222 and the inner-diameter portion 211 of the brake housing 210 at one end of the protrusion 231 to which the external force is applied.

Therefore, the locked state in which the rotation of the rotary part 100 is restricted may be implemented.

Next, an operation during an unlocking process of the present invention will be described specifically.

As illustrated in FIG. 9, during the unlocking process, the second motor M2 operates prior to the operation of the first motor M1. The power of the second motor M2 may be transmitted to the pulley 230 via the second pinion gear 250 and the belt B, such that the pulley 230 may rotate.

One side lock pin LP, which is fitted in the first guide groove 221, may move in the fitting release direction by being pushed by the protrusion 231 by the rotation of the pulley 230, and one side lock pin LP, which is fitted in the second guide groove 222, may move in the fitting release direction by being pushed by the protrusion 231.

Therefore, the unlocked state in which the rotary part 100 is rotatable may be implemented.

As described above, the present invention may prevent the motion of the vehicle seat by restricting the rotation of the rotary part by using the operation of the locking device in the event of a non-hard stop. In addition, the present invention may prevent the motion of the vehicle seat by restricting the rotation of the rotary part by using the locking device in the event of a non-hard stop, thereby significantly improving the ride quality.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A swivel device for a vehicle seat, the swivel device comprising:
   a rotary part including a ring gear and a first pinion gear connected to a first motor and configured to engage with the ring gear; and
   a locking device configured to restrict a rotation of the rotary part when an external force is applied to the rotary part when the rotary part is in a stopped state,
   wherein the rotary part further comprises a first mounting bracket on which the ring gear is mounted,
   wherein the locking device comprises:
   a brake housing disposed on an upper portion of the first mounting bracket;
   a brake drum coupled in the brake housing and having guide grooves into which lock pins are to be inserted, the guide grooves being disposed in at least one of an inner-diameter portion and an outer-diameter portion of the brake drum; and
   a pulley having a gear portion defined on an outer-diameter portion thereof, the pulley having protrusions configured to be inserted into the guide grooves and defined on one surface of the pulley directed toward the guide grooves, and
   wherein the lock pins are disposed in the guide grooves, and two of the lock pins are disposed at two opposite sides of a protrusion with the protrusion being interposed there between.

2. The swivel device of claim 1, wherein the guide grooves comprise:
   a first guide groove defined along the inner-diameter portion of the brake drum; and
   a second guide groove defined along the outer-diameter portion of the brake drum, and
   wherein a ring portion of a housing bracket is coupled to the inner-diameter portion of the brake drum.

3. The swivel device of claim 2, wherein a width between an inner race portion of the first guide groove and an outer-diameter portion of the ring portion decreases in a direction from two opposite ends of the first guide groove to two opposite ends of the protrusion so that a respective lock pin is fitted, and the width increases in a direction from the two opposite ends of the protrusion to the two opposite ends of the first guide groove so that the respective lock pin is released.

4. The swivel device of claim 3, wherein the ring portion extends from a main body portion of the housing bracket, penetrates an inner-diameter portion of the pulley, and is coupled to the inner-diameter portion of the brake drum.

5. The swivel device of claim 2, wherein a width between an inner race portion of the second guide groove and an inner-diameter portion of the brake housing decreases in a direction from two opposite ends of the second guide groove to two opposite ends of the protrusion so that a respective lock pin is fitted, and the width increases in a direction from the two opposite ends of the protrusion and the two opposite ends of the second guide groove so that the respective lock pin is released.

6. The swivel device of claim 3, wherein elastic members are disposed at the two opposite ends of the first guide groove and two opposite ends of the second guide groove and elastically support the lock pins.

7. The swivel device of claim 6, wherein insertion grooves are provided at the two opposite ends of each of the first guide groove and the second guide groove, and the elastic members are at least partially inserted into the insertion grooves.

8. The swivel device of claim 2, wherein the gear portion of the pulley is connected to a belt, the belt is connected to a second pinion gear, and the second pinion gear is connected to a second motor.

9. The swivel device of claim 6, wherein when the external force is applied to the rotary part when the rotary part is the stopped state, one side lock pin, which is elastically supported by an elastic member, is fitted between the inner race portion of the first guide groove and the outer-diameter portion of the ring portion at one end of the protrusion, such that a locked state in which the rotation of the rotary part is restricted is implemented.

10. The swivel device of claim 8, wherein the second motor operates prior to an operation of the first motor, power of the second motor is transmitted to the pulley via the second pinion gear and the belt, the pulley rotates, and one side lock pin, which is fitted in the first guide groove, and one side lock pin, which is fitted in the second guide groove, move in a fitting release direction by being pushed by the protrusions by the rotation of the pulley, such that an unlocked state in which the rotary part is rotatable is implemented.

11. The swivel device of claim 1, wherein a first fixing member connected to the rotary part is connected to a movement rail mounted on a floor in an interior of a vehicle.

12. The swivel device of claim 2, wherein the locking device further comprises:

a second mounting bracket connected to the first mounting bracket;

a connection bracket connected to a main body portion of the housing bracket and the second mounting bracket;

a cover coupled to an upper portion of the brake housing; and a second fixing member coupled to an upper portion of the cover and having at least one side connected to the second mounting bracket by a connection member.

13. The swivel device of claim 12, wherein the second mounting bracket is connected to the vehicle seat.

\* \* \* \* \*